United States Patent [19]
Imai et al.

[11] 3,911,458
[45] Oct. 7, 1975

[54] PROGRAMME-CONTROLLED SHUTTER FOR MINIATURE CAMERAS

[75] Inventors: Tadayuki Imai, Kawasaki; Yoshitaka Shiratori, Sohka, both of Japan

[73] Assignee: Ricoh Co., Ltd., Tokyo, Japan

[22] Filed: Dec. 3, 1973

[21] Appl. No.: 421,323

[30] Foreign Application Priority Data
Dec. 4, 1972   Japan............................ 47-138474

[52] U.S. Cl. .................. 354/230; 354/26; 354/30; 354/45; 354/52
[51] Int. Cl. ............................................ G03b 7/12
[58] Field of Search ............ 354/26, 30, 40, 45, 52, 354/270, 271, 274, 139, 230

[56] References Cited
UNITED STATES PATENTS

| | | | |
|---|---|---|---|
| 2,952,199 | 9/1960 | Burger et al. | 354/45 |
| 3,393,619 | 7/1968 | Albedyll et al. | 354/26 |
| 3,563,142 | 2/1971 | Harvey | 354/45 |
| 3,608,449 | 9/1971 | Fauth et al. | 354/30 |
| 3,618,488 | 11/1971 | Fauth et al. | 354/30 |

*Primary Examiner*—Richard A. Wintercorn
*Assistant Examiner*—Russell E. Adams, Jr.
*Attorney, Agent, or Firm*—Cooper, Dunham, Clark, Griffin & Moran

[57] ABSTRACT

A camera shutter mechanism wherein depression of a release button causes a connecting lever to be horizontally displaced over a distance dependent upon the angular position of the needle of an exposure meter, the position being indicative of the brightness of a subject, so that as the horizontal position of the connecting lever is displaced, the angular position of an aperture control cam is varied. When the release button is further depressed, a drive pawl is adapted to cause a flywheel to rotate so that a control pin extending from this flywheel is moved away from an arcuate cam surface of the aperture control cam to permit the rotation of a shutter blade drive lever until it engages with the arcuate cam surface of the control cam whereby the shutter blades are opened. When the control pin is returned to its initial position and engaged with the arcuate cam surface of the control cam again, the shutter blade drive lever is returned to its initial position to close the shutter blades. The degree of opening of the shutter blades is dependent upon the angle of rotation permitted to the shutter blade drive lever.

When a flashcube is mounted, the exposure meter is made inoperative and the degree of opening of the shutter blades is dependent upon a distance to a subject by the stroke of displacement of a shutter blade drive pin which in turn is determined by a flashmatic cam which is operatively coupled to a distance setting ring.

3 Claims, 3 Drawing Figures

PROGRAMME-CONTROLLED SHUTTER FOR MINIATURE CAMERAS

BACKGROUND OF THE INVENTION:

The present invention related to a programme-controlled shutter for a miniature camera of the type controlling the degree of opening of the shutter blades in response to the indication of an exposure meter and in the case of flash photographing in response to an indication of the distance to a subject while the exposure meter is made inoperative.

In the conventional programme-controlled shutters, a flywheel which is rotated when a shutter release button is depressed is made integral with a cam controlling the degree of opening of the shutter blades. Since the angle of rotation of the flywheel is dependent upon the angular position of a needle of an exposure meter, an aperture and a shutter speed are uniquely determined. Furthermore the cam is attached to the flywheel so that the aperture and the shutter speed cannot be adjusted independently of each other. Therefore the adjustment of exposure is extremely difficult, and it is impossible to obtain various combinations of shutter speeds and apertures.

There has been proposed a flash device in which an aperture and a shutter speed are determined in response to the indication of an exposure meter and in the case of flash photography an aperture is determined by the distance to a subject. The conventional flashmatic device has a complicated mechanism for selecting a photography setting under the control of an exposure meter or for flash photography so that it is extremly difficult to incorporate the device in a miniature camera with limited space. Furthermore, the cost is expensive and breakdown is likely to occur very often.

SUMMARY OF THE INVENTION:

The present invention provides a programme-controlled shutter for a miniature camera whose degree of opening of the shutter blades or aperture and shutter speed may be adjusted independently of each other.

An object of the present invention is to provide a programme-controlled shutter for a miniature camera which may adjust the degree of opening of shutter blades or aperture and shutter speed by a very simple mechanism.

A further object of the present invention is to provide a programme-controlled shutter for a miniature camera which may be selectively switched by a simple mechanism to a photographic mode under the control of an exposure meter or to a flash-photographic mode.

The above and other objects, features and advantages of the present invention will become more apparent from the following description of the preferred embodiments thereof taken in conjunction with the accompanying drawing.

Figure 1:
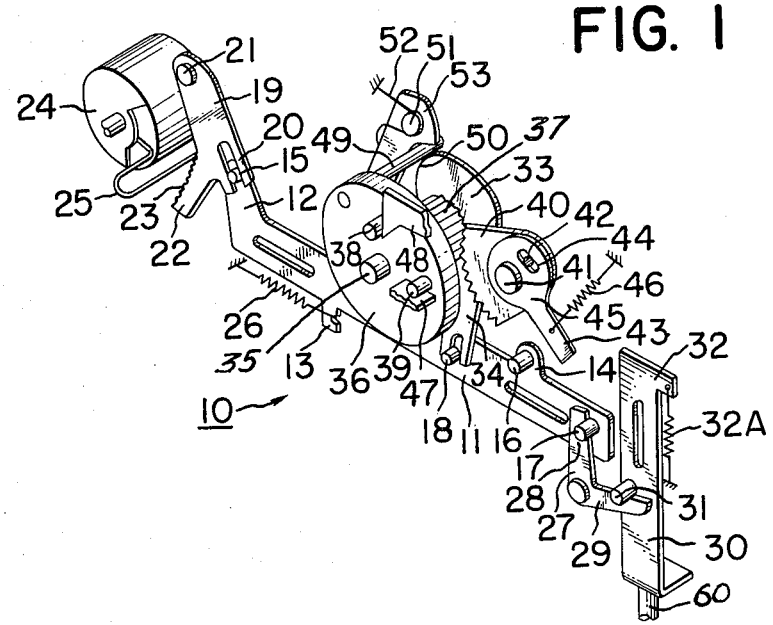
FIG. 1 is a perspective view of a first embodiment of the present invention.
Figure 2:
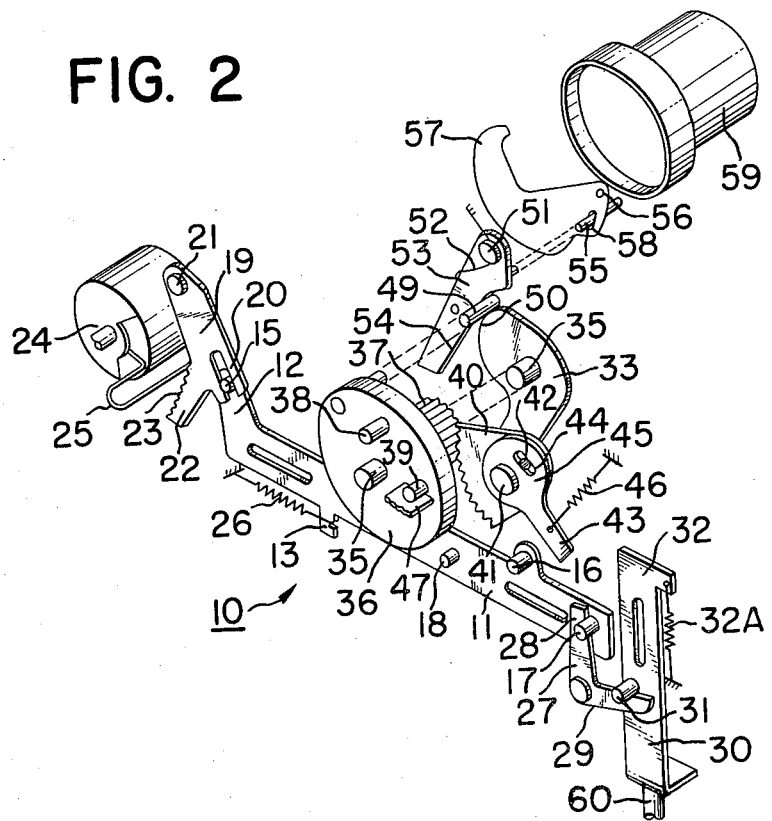
FIG. 2 is an exploded perspective view the embodiment of FIG. 1.

DESCRIPTION OF THE PREFERRED EMBODIMENTS:

First Embodiment, FIGS. 1 and 2

Referring to FIGS. 1 and 2, a first embodiment of a programme-controlled shutter 10 in accordance with the present invention is shown having a connecting lever 11 which is slidable in the horizontal direction and which is provided with a left projection 12, a spring hanger projection 13, and a right projection 14. The connecting lever 11 is also provided with a left pin 15 extending from the left projection 12, a stop pin 16 extending from the right upright projectin 14, a right pin 17 at the right end, and a center pin 18 substantially at the midpoint of the connecting lever 11. The left pin 15 at the left projection 12 is in engagement with a bifurcated arm 20 of a needle arresting lever 19 which is pivoted on a pivot pin 21 and has a branched arm 22 which is perpendicular to the bifurcated arm 20 and is provided with teeth 23 for engagement with a meter needle 25 of an exposure meter 24 as will be described in more detail hereinafter. A spring 26 whose one end is fixed to the hanger projection 13 is adapted to normally urge the connecting lever 11 in the left direction in the figures.

The right pin 17 of the connecting lever 11 is in engagement with one arm 28 of a bell crank lever 27 whose other arm 29 is in engagement with a pin 31 extending from a release lever 30. A spring 32A has its one end fixed to a projection 32 of the release lever 30 so that the latter is normally urged in the downward direction against a shutter release button 60. The center pin 18 of the connecting lever 11 is in engagement with a bifurcated arm 34 of an aperture control cam 33 which is carried by a shaft 35 for free rotation therearound so that the angular position of the aperture control cam 33 may be varied when the connecting lever 11 is displaced in a manner to be described in more detail hereinafter.

The shaft 35 also carries a gear 37 and a flywheel 36 made integral with the gear 37. The flywheel 36 is provided with pins 38 and 39 extending from the major surface opposite to the gear 37. The gear 37 is in mesh with a segment gear 40 carried by a shaft 41 to which is pivotably fixed a speed control lever 45. A speed adjusting screw 42 extending from one major surface of the segment gear 40 is fitted into an elongated slot 44 in the speed control lever 45 so as to securely hold the speed control lever 45 and the segment gear 40 in a predetermined angular position with respect to each other. That is, the angular position of an extension 43 of the speed control lever 45 may be varied by loosening the speed adjusting screw 42, rotating the speed control lever about the axis of shaft 41 through a desired angle and then tightening the adjusting screw 42. A spring 46 has its end fixed to the extension 43 of the speed control lever 45 so that the latter is normally urged in the counterclockwise direction. Therefore upon rotation in the counterclockwise direction of the speed control lever 45, the segment gear 40 is also caused to rotate in the counterclockwise direction so that the flywheel 36 is caused to rotate in the clockwise direction. The rotation of the flywheel 36 in the clockwise direction is limited by the engagement of pin 39 with a stopper 47 provided on the body of the camera.

The pin 38 of the flywheel 36 is adapted to engage with a drive pawl 48 as shown in FIG. 1. That is, when the film advancing mechanism (not shown) is actuated, the drive pawl 48 is adapted to move to the left in FIG. 1 and to ride over the pin 38 into the position shown in FIG. 1, but when the shutter is released, the drive pawl 48 pushes the pin 38 in the left direction so that the flywheel 36 is caused to rotate in the counterclockwise direction.

One end of a control pin or flywheel pin 49 is securely fixed to the flywheel 36 in the proximity of its periphery in parallel with the axis thereof and the other end is in engagement not only with an arcuate cam surface 50 of the aperture control cam 33 but also with an engaging surface 54 of a shutter blade drive lever 53 which is pivoted on a pin 51 and is normally urged to rotate in the counter-clockwise direction under the force of a spring 52. The shutter blade drive lever 53 is so positioned with respect to the aperture control cam 33 that when the control pin 49 is rotated in the counterclockwise direction away from the aperture control cam 33, the engaging surface 54 of the drive lever 53 may engage with the arcuate cam surface 50 of the aperture control cam 33 as will be described in more detail hereinafter.

As seen in FIG. 2, the free end of a shutter blade drive pin 55 extending from the shutter blade drive lever 53 is loosely fitted into an elongated slot 58 of a shutter blade 57 pivotably fixed to a pivot pin 56. The shutter blade 57 is one of a pair of shutter blades of a conventional shutter blade assembly, but the other shutter blade is not shown in FIG. 2 for the sake of simplicity. The shutter blade 57 is opened when the shutter blade drive lever 53 is rotated in the counterclockwise direction and is closed in the position shown in FIG. 2.

Next the Mode of operation will be described.

1. BEFORE THE SHUTTER RELEASE BUTTON IS PUSHED

Before the shutter release button 60 is pushed, the release lever 30 is in its initial position under the force of the spring 32A so that the bell crank lever 27 is urged to rotate in the clockwise direction as the pin 31 pushes the arm 29 downwardly. As a result the other arm 28 of the bell crank lever 27 urges the right pin 17 and hence the connecting lever 11 to the right against the action of spring 26, so that the left pin 15 at the left projection 12 of the connecting lever 11 urges the needle arresting lever 19 to rotate in the counterclockwise direction releasing the meter needle 25 of the exposure meter 24 from engagement with the toothed portion 23 of the branched arm 22. Thus the meter needle 25 of the exposure meter is free to swing. The center pin 18 of the connecting lever 11 in engagement with the bifurcated arm 34 of the aperture control cam 33 urges the cam 33 to rotate in the counterclockwise direction.

Since the speed control lever 45 and hence the segment gear 40 are urged in the counterclockwise direction under the force of the spring 46, the gear 37 and hence the flywheel 36 are rotated in the clockwise direction until the pin 39 engages with the stopper 47. The control pin 49 is in engagement with the top of the arcuate cam surface 50 of the aperture control cam 33 and causes the shutter blade drive lever 53 to be spaced from the control cam 33 as shown in FIGS. 1 and 2.

2. When the shutter release button is pushed:

When lens 59 is directed toward a subject, the meter needle 25 stops in a position to indicate the brightness of the subject. When the shutter release button 60 is then pushed, the release lever 30 is caused to move upwardly in FIG. 2 against the spring 32A so that the connecting lever 11 is moved to the left under the force of the spring 26 until the toothed portion 23 of the needle arresting lever 19 which is rotated in the clockwise direction by the pin 15 of the connecting lever 11 engages the meter needle 25.

The center pin 18 of the connecting lever 11 causes the aperture control cam 33 to rotate in the clockwise direction about the shaft 35 so that the angular position of the arcuate cam surface 50 with respect to the engaging surface 54 of the shutter blade drive lever 53 is determined. In other words, the angle of rotation to be permitted to the shutter blade drive lever 53 upon release is determined. It should be noted that even when the aperture control cam 33 is rotated in the manner described above, the flywheel 36 remains stationary.

When the shutter button 60 is further depressed, the drive pawl 48 is adapted to push or kick the pin 38 of the flywheel 36 to rotate the same in the counterclockwise direction until the pawl rides over the pin 38. The rotation in the counterclockwise direction of the flywheel 36 is stopped and pawl 48 rides over pin 38 when the extension 43 of the speed control lever 45 which is caused to rotate in the clockwise direction against the spring 46 by the counterclockwise rotation of the flywheel engages with the pin 16 of the connecting lever 11. Thus it is seen that the angular position of the extension 43 of the speed control lever 45 with respect to the segment gear 40 determines the angle of rotation of the flywheel 36. As soon as the extension 43 of the speed control lever 45 strikes against the pin 16, pawl 48 rides over pin 38 and the flywheel 36 is reversed in rotation under the force of the spring 46 which is transmitted thereto through the speed control lever 45, the segment gear 40 and the gear 37, and the rotation in the clockwise direction of the flywheel 36 continues until the pin 39 again engages the stopper 47. Thus the flywheel 36 is returned to its initial position.

When the control pin 49 is displaced to the leftmost and lowermost position as the flywheel 36 is rotated in the counterclockwise direction, its free end is moved away from between the arcuate cam surface 50 of the aperture control cam 33 and the engaging surface 54 of the shutter blade drive lever 53 so that the latter is permitted to rotate about its pivot pin 51 in the counterclockwise direction by the spring 52 until its engaging surface 54 engages the arcuate cam surface 50. Thus the shutter blade drive pin 55 is caused to swing in the counterclockwise direction to rotate the shutter blade 57 in the counterclockwise direction, thereby opening the shutter. Since the flywheel 36 is immediately returned to its initial position in the manner described hereinbefore, the control pin 49 is also returned to its initial position so that the shutter blade drive lever 53 is returned to its initial position. Therefore the shutter blade 57 is immediately closed.

The shutter speed, that is the speed at which the shutter blade 57 is opened and then closed, is therefore dependent upon the time required for the flywheel 36 to rotate through a predetermined angle and then return to its initial position in the manner described hereinbefore. Therefore the shutter speed may be adjusted by adjusting the angular position of the extension 43 of the speed control lever 45 with respect to the segment gear 40 in the manner described hereinbefore.

When the shutter button 60 is returned from its depressed position, the connecting lever 11 is returned to its initial position in the manner described hereinbefore, and the meter needle 25 is again permitted to swing freely. When the film is advanced, the drive pawl 48 is returned to its initial position shown in FIG. 1.

In summary, the aperture of the shutter blade 57 is determined depending upon the position at which the needle 25 of the exposure meter 24 is arrested by the needle arresting lever 19 when the connecting lever 11 is displaced to the left and the shutter speed is dependent upon the angular position of the extension 43 of the speed control lever 45 and is adjusted by the adjusting screw 42.

SECOND EMBODIMENT, FIG. 3

Figure 3:
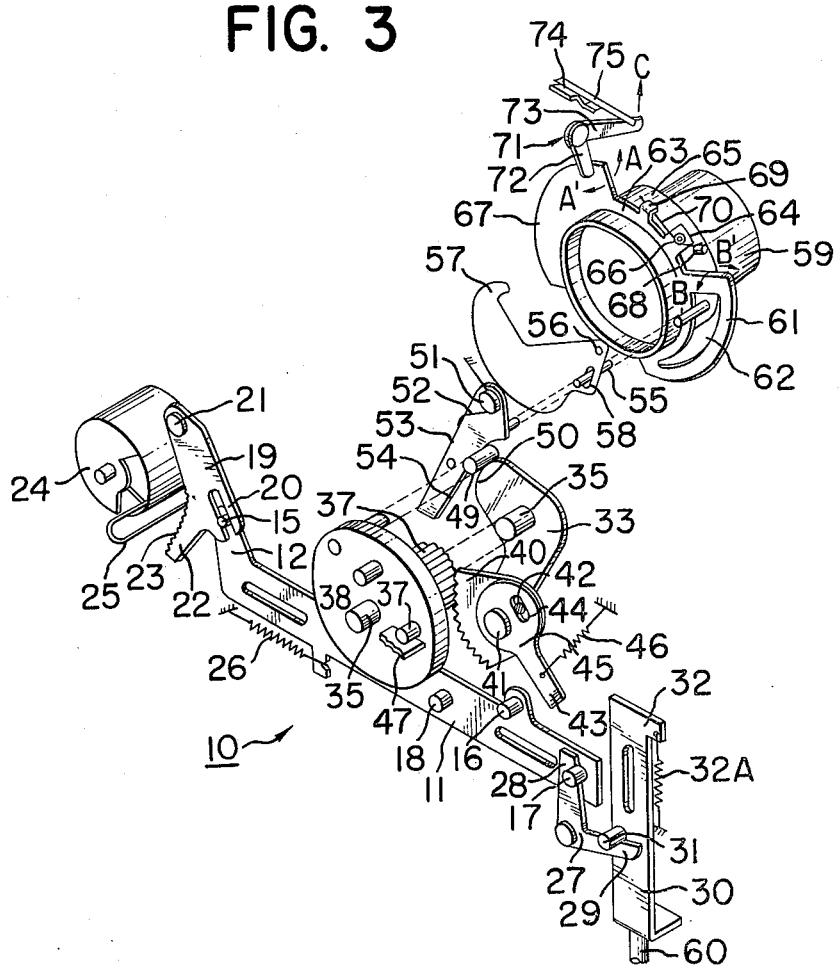
FIG. 3 is an exploded perspective view of a second embodiment of the present invention.

The second embodiment of the present invention shown in FIG. 3 is substantially similar to the first embodiment described hereinbefore with reference to FIGS. 1 and 2 except that an aperture or stop defined by the shutter blades 57 is controlled not by the exposure meter but by flashmatic cam 61 when a flashcube is used for flash photographing as will be described in more detail hereinafter.

The shutter blade drive pin 55 fixed to the shutter blade drive lever 53 is extended beyond the elongated hole 58 of the shutter blade 57 to a position very close to a fan-shaped cam groove 62 of the flashmatic cam 61 which is formed integral with a ring 63 so as to extend outwardly at a right angle with respect to the optical axis of the lens 59. The ring 63 is fitted over the lens barrel 59 and has a projection 64 extending forwardly in parallel with the optical axis of the lens barrel 59 and is pivotably mounted for rotation about the axis of a pivot pin 66 on a distance setting ring 65 fitted over the lens barrel 59. A pressure fin 67 is also formed integral with the ring 63 and is angularly spaced apart from the flashmatic cam plate 61 by about 180°.

Between a pin 68 extending from the distance setting ring 65 and a projection 69 of the ring 63 is loaded a spring 70 to urge the ring 63 in such a way that the pressure fin 67 may be normally urged in the direction indicated by the arrow A' while the flashmatic cam plate 61 is urged in the direction indicated by the arrow B'. One arm 72 of a pivoted bell crank lever 71 is in engagement with the pressure fin 67 while the other arm 73 is in engagement with a contact 75 of an on-off switch 74 of an exposure meter circuit.

Next the mode of operation will be described. When no flashcube is used, the pressure fin 67 is urged in the direction indicated by the arrow A' while the flashmatic cam 61 is urged in the direction indicated by the arrow B' under the force of the spring 70 so that the free end of the shutter blade drive pin 55 is not inserted into the fan-shaped cam groove 62 of the flashmatic cam plate 61. That is, the swing of the shutter blade drive pin 55 is not limited. Therefore the mode of operation is substantially similar to that of the first embodiment described hereinbefore.

However when a flashcube is mounted, the arm 73 of the selection lever 71 is caused to rotate in the direction indicated by the arrow C in FIG. 3 so that the contact 75 is raised to open the on-off switch 74 thereby opening the exposure meter circuit. Therefore the meter needle 25 is returned to its zero position close to the lower end of the toothed portion 23 of the needle arresting lever 19, so that the shutter blade drive lever 53 may be rotated through the maximum angle when the shutter release button 60 is depressed. The arm 72 of the selection lever 71 pushes the pressure fin 67 in the direction indicated by the arrow A so that the flashmatic cam 61 is displaced in the direction indicated by the arrow B, and the free end of the shutter blade drive pin 55 is fitted into the cam groove 62 of the flashmatic cam plate 61. Since the ring 63 and hence the flashmatic cam 61 are rotated in unison with the distance setting ring 65 about the axis of the lens barrel 59, the stroke of the shutter blade drive pin 55 is varied in response to a distance set by the distance setting ring 65. More particularly, the cam groove 62 of the flashmatic cam 61 is so designed that when the distance is set to infinity, the stroke of the shutter blade drive pin 55 may become maximum while when the distance is set to the minimum distance, the stroke of the drive pin 55 may become minimum. In other words, the width of the cam groove 62 is so determined that the stroke of the displacement of the shutter blade drive pin 55 may be dependent upon the distance set by the setting ring 65.

When the shutter release button 60 is depressed, the stroke of the displacement to the left of the connecting lever 11 is maximum, and when the shutter release button 60 is further depressed the drive pawl 48 rotates the flywheel 36 in the manner described hereinbefore. The control pin 49 is moved away from the arcuate cam surface 50 of the aperture control cam 33 so that the rotation of the shutter blade drive lever 53 through the maximum angle may be permitted, but the stroke of the displacement of the shutter blade pin 55 is limited by the width of the cam groove 62 of the flashmatic cam 61 depending upon the distance set. Thus the aperture defined by the shutter blade 57 is set depending upon the distance set, so that the flash photographing may be accomplished under the optimum exposure conditions.

In the second embodiment, the selection lever 71 has been described as pushing a pressure fin 67 in the case of the flash photographing, but it is to be understood that it may be so arranged as to push the flashmatic cam 61 directly.

Further the second embodiment of the present invention has been described as being applied to a programme-controlled shutter, but it is to be understood that the present invention may also be applied to a conventional shutter.

What is claimed is:

1. A shutter control mechanism for cameras of the type including:
   a. shutter blades;
   b. operating means for opening and closing said shutter blades;
   c. a depressible release button for actuating said operating means; and
   d. an exposure meter having a movable indicator needle;

wherein the improvement comprises:
   e. a displaceable connecting lever;
   f. means for urging said connecting lever toward displacement in one direction;
   g. means for holding said connecting lever against displacement by said urging means and for releasing said connecting lever upon the initial depression of said release button;
   h. means on said connecting lever for sensing the position of said indicator needle and for stopping the displacement of said connecting lever in accordance therewith;
i. a rotatable cam having an aperture setting cam surface thereon;
j. means for rotating said cam in accordance with the displacement of said connecting lever;
k. a rotatable flywheel;
l. a gear attached to said flywheel for rotation therewith;
m. rotatable means cooperating with said gear for urging said flywheel in rotation in one direction;
n. stop means for holding said flywheel against rotation in said one direction by said rotatable means;
o. drive means for releasably rotating said flywheel in the opposite direction upon the further depression of said release button;
p. shutter speed setting means on said rotatable means for releasing said flywheel from rotation by said drive means;
q. means on said connecting lever for actuating said shutter speed setting means to release said flywheel and permit it to return to said stop means under the urging of said rotatable means;
r. a pivotable lever adjacent said cam surface and operatively connected to said operating means for controlling the opening and closing of said shutter blades;
s. means for urging said pivotable lever toward engagement with said cam surface; and
t. stop means on said flywheel for holding said pivotable lever against engagement with said cam surface and for releasing said pivotable lever upon the rotation of said flywheel in said opposite direction whereby the distance said pivotable lever travels to engage said cam surface upon release determines the shutter aperture and the time of rotation of said flywheel in said opposite direction and return determines the shutter speed.

2. A mechanism as in claim 1 further comprising means on said rotatable means for adjusting the position of said shutter speed setting means thereon.

3. A mechanism as in claim 1 further comprising:
u. a distance setting ring mounted for rotation during the focusing of the camera;
v. a second ring member pivotable about a transverse axis between an active position and an inactive position and connected for rotation with said distance setting ring;
w. cam means on said second ring member for engaging and controlling said shutter operating means when said second ring member is in its active position; and
x. means for pivoting said second ring member to its active position when a flash cube is mounted on the camera and for deactivating said exposure meter to maximize the displacement of said connecting lever.

* * * * *